March 10, 1970 S. G. VENNING 3,500,386

COUNTER CONTROL CIRCUIT FOR AN ANALOG TO DIGITAL CONVERTER

Filed June 26, 1967 5 Sheets-Sheet 1

INVENTOR.
SELBY G. VENNING

BY Gerald R. Woods

HIS ATTORNEY

March 10, 1970 S. G. VENNING 3,500,386

COUNTER CONTROL CIRCUIT FOR AN ANALOG TO DIGITAL CONVERTER

Filed June 26, 1967 5 Sheets-Sheet 2

United States Patent Office 3,500,386

Patented Mar. 10, 1970

3,500,386

COUNTER CONTROL CIRCUIT FOR AN ANALOG TO DIGITAL CONVERTER

Selby G. Venning, Roanoke, Va., assignor to General Electric Company, a corporation of New York Filed June 26, 1967, Ser. No. 648,921

Int. Cl. H03k *13/02, 21/06*

U.S. Cl. 340—347 6 Claims

ABSTRACT OF THE DISCLOSURE

An analog to digital converter with a reversible counter controlling positive current sources. A pulse gating circuit includes shift register elements which accept an input from an amplifier in which negative analog currents are balanced with the positive currents. The amplifier output determines the state which the first element assumes when pulsed by a clock pulse. The first element's output determines the state which the second element assumes when pulsed by the inverted clock pulse. When both elements are in the same state, the counter contents change at a clock pulse rate in a direction determined by the common state. A deadband current source prevents changes in counter contents when the analog input remains constant after being balanced by the counter controlled positive current sources.

BACKGROUND OF THE INVENTION

The present invention relates to analog to digital converters and more particularly to a circuit for controlling a reversible binary counter found in such a converter.

The use of digital computers for process control purposes requires that electrical information based on certain qualities of the processes be applied to the computer. Voltage or current sensors produce analog or non-numerical signals which must be converted to digital or numerical signals before they can be utilized by the computer. One of the primary advantages of process computers is the speed with which they can act to control and correct a process once an undesirable deviation in the process is detected. The interval required to correct a process deviation can be divided into two time segments. The first time segment is the reaction time of the computer and the equipment it controls once digital information identifying the deviation is applied at the computer inputs. The second time segment is the time required to convert a deviation-identifying analog signal to a digital signal before applying it to the computer. It is a purpose of the present invention to provide a counter control circuit which reduces the length of the second time segment.

SUMMARY OF THE INVENTION

The present invention includes a pulse gating circuit which causes a reversible binary counter to count at a rate determined by a source of clock pulses and in a direction dependent upon the logic level of a binary steering signal from an amplifier having an analog input. The pulse gating circuit includes a first bistable device which has a steering input terminal connected to the amplifier, a pulse input terminal connected to the clock pulse source, and an output terminal. The first bistable device is steered at the leading edge of a clock pulse to a first condition for one logic level of the binary steering signal and to a second condition for a second logic level of the binary steering signal. The clock pulses are inverted before being applied to a second bistable device which also has a steering input terminal connected to the output terminal of the first bistable device, a pulse input terminal, and an output terminal connected to the reversible binary counter. The second bistable device is steered at the trailing edge of a clock pulse to the then existing state of the first bistable device. A gating means responds to concurrent similar conditions of the first and second bistable devices to gate clock pulses to the reversible counter to cause that counter to count at a clock pulse rate in a direction determined by the logic level of the signal on the output terminal of the second bistable device.

DESCRIPTION OF THE DRAWINGS

While the specification concludes with claims particularly pointing out and distinctly claiming that which is regarded as the present invention, the details of one embodiment of the invention along with its further objects and advantages may be more readily ascertained from the following detailed description when read in conjunction with the accompanying drawings in which:

DETAILED DESCRIPTION

Figure 1:
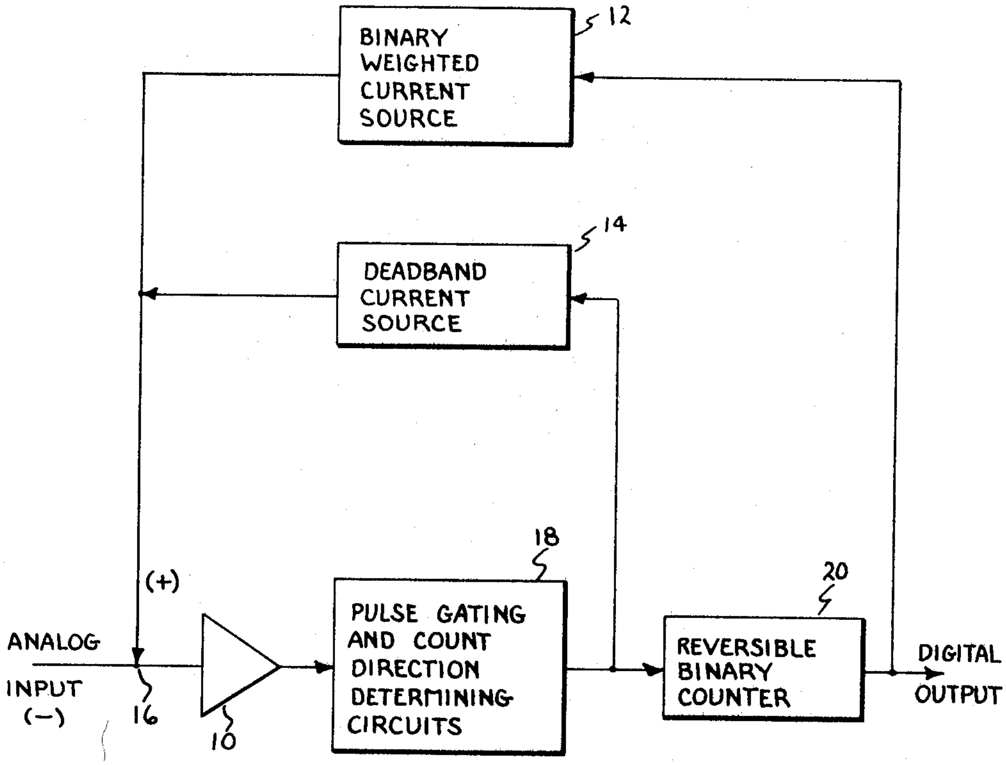
FIG. 1 is a block diagram of a system into which the present invention may be incorporated.

Referring now to FIG. 1, a negative analog current from a process-monitoring sensor (not shown) is applied to a summing junction 16 on a comparison amplifier 10 together with positive source current from a current source 12 and from a deadband current source 14. When the magnitude of the negative analog current is greater than the magnitude of the positive source current, the comparison amplifier 10 generates a logic ONE signal (+5 volts) which is applied to pulse gating and count direction determining circuits 18. The signal on the output terminals of the circuits 18 controls the direction in which a reversible binary counter 20 counts. The count existing in the reversible binary counter 20 determines the magnitude of the current generated by the positive current source 12. As the counter 20 counts up, the positive source current applied at the summing junction 16 increases until it is approximately equal to the negative analog current. Deadband current source 14, which is controlled by the circuits 18, is used to prevent the binary counter 20 from changing counts due to electrical noise on the analog input when the positive current applied to the summing junction 16 is balanced with or has approximately the same magnitude as a relatively constant negative analog current.

If the negative analog current is reduced leaving the magnitude of the positive source current at summing junction 16 greater than the magnitude of the negative analog current, the comparison amplifier 10 generates a logic ZERO signal (+0 volt) which is applied to the circuits 18. The reversible binary counter 20 then counts down at a clock pulse rate to reduce the magnitude of the current generated by the positive current source 12. When the magnitude of the positive current has decreased to the magnitude of the new value of negative analog current, the deadband current source 14 once again prevents fluctuations in the contents of counter 20 due to electrical noise on the analog input.

Figure 2:
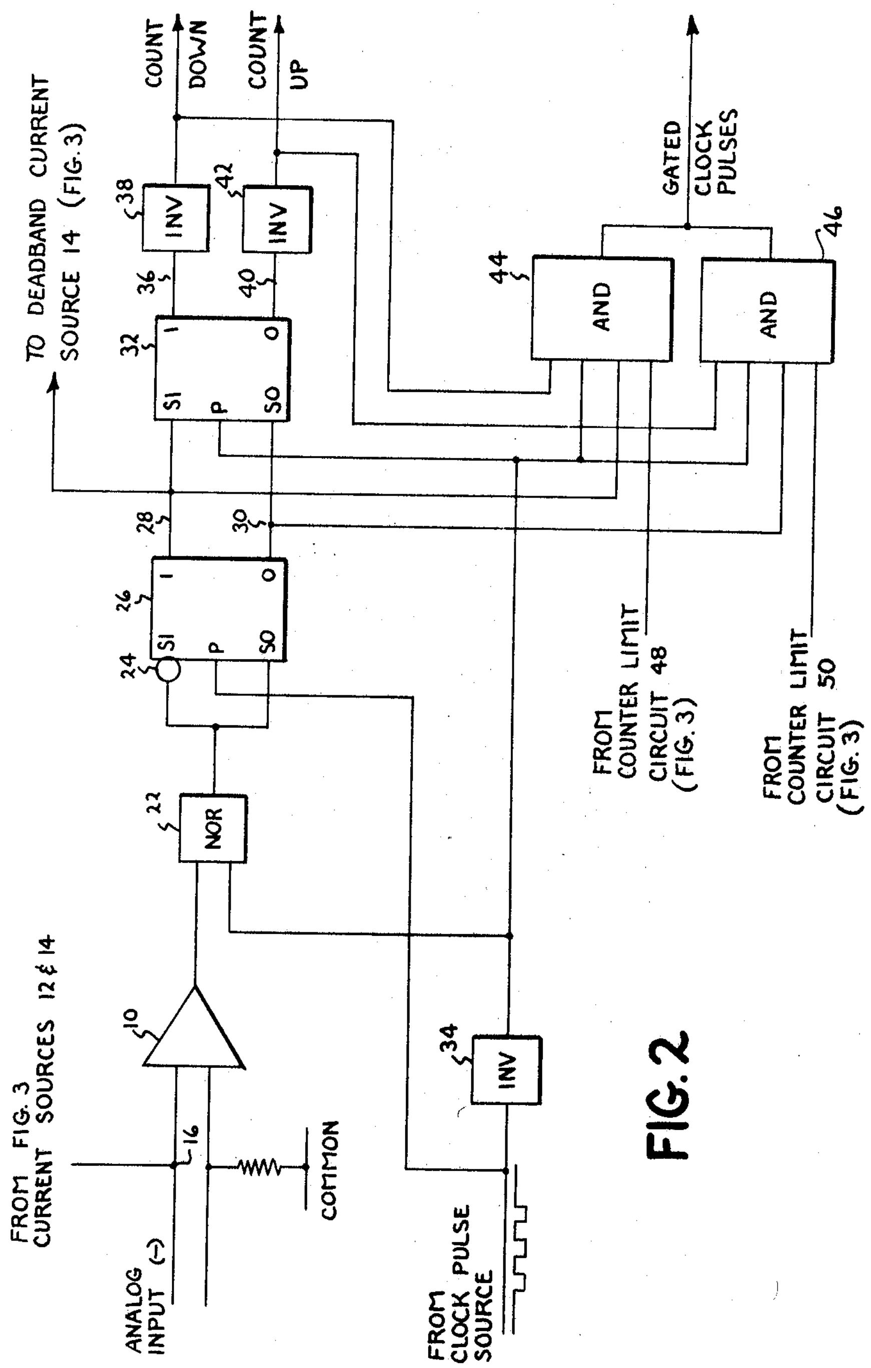
FIG. 2 is a schematic diagram of a pulse gating section for a counter control circuit constructed in accordance with the present invention.

FIG. 2 shows that the comparison amplifier 10 is connected to a NOR circuit 22, the output of which is connected both to a steering terminal S0 for a first shift register element 26 and through an inverter 24 to a steering terminal S1 for that shift register element. The shift register element 26 is a bistable device including the steering input terminals S1 and S0, a pulse input terminal P, a normal output terminal 28, and an inverse output terminal 30. If a ONE signal is applied to steering terminal S1 while a ZERO signal is applied to the steering terminal S0, the trailing edge of a positive-going clock pulse on the pulse input terminal P steers the shift register element 26 into its first or set condition. When the shift register element 26 is in its set condition, a ONE signal appears on its normal output terminal 28 while a ZERO signal appears on its inverse output terminal 30. If a ONE signal is applied to the steering terminal S0 while a ZERO signal is applied to the steering terminal S1, the trailing edge of a pulse applied to the pulse input terminal P causes the shift register element 26 to be driven into its reset or second condition wherein the inverse output terminal 30 carries a ONE signal while the normal output terminal 28 carries a ZERO signal.

The normal output terminal 28 and the inverse output terminal 30 of the shift register element 26 are connected to steering terminals S1 and S0 respectively for a second shift register element 32. Clock pulses produced by a conventional pulse source (not shown) are applied directly to the pulse input terminal P of shift register element 26 and indirectly through an inverter element 34 to the pulse input terminal P for the shift register element 32. The normal output terminal 36 for the shift register element 32 is connected to an inverter element 38 while the inverse output terminal 40 for that shift register element is connected to an inverter 42.

Figure 3:
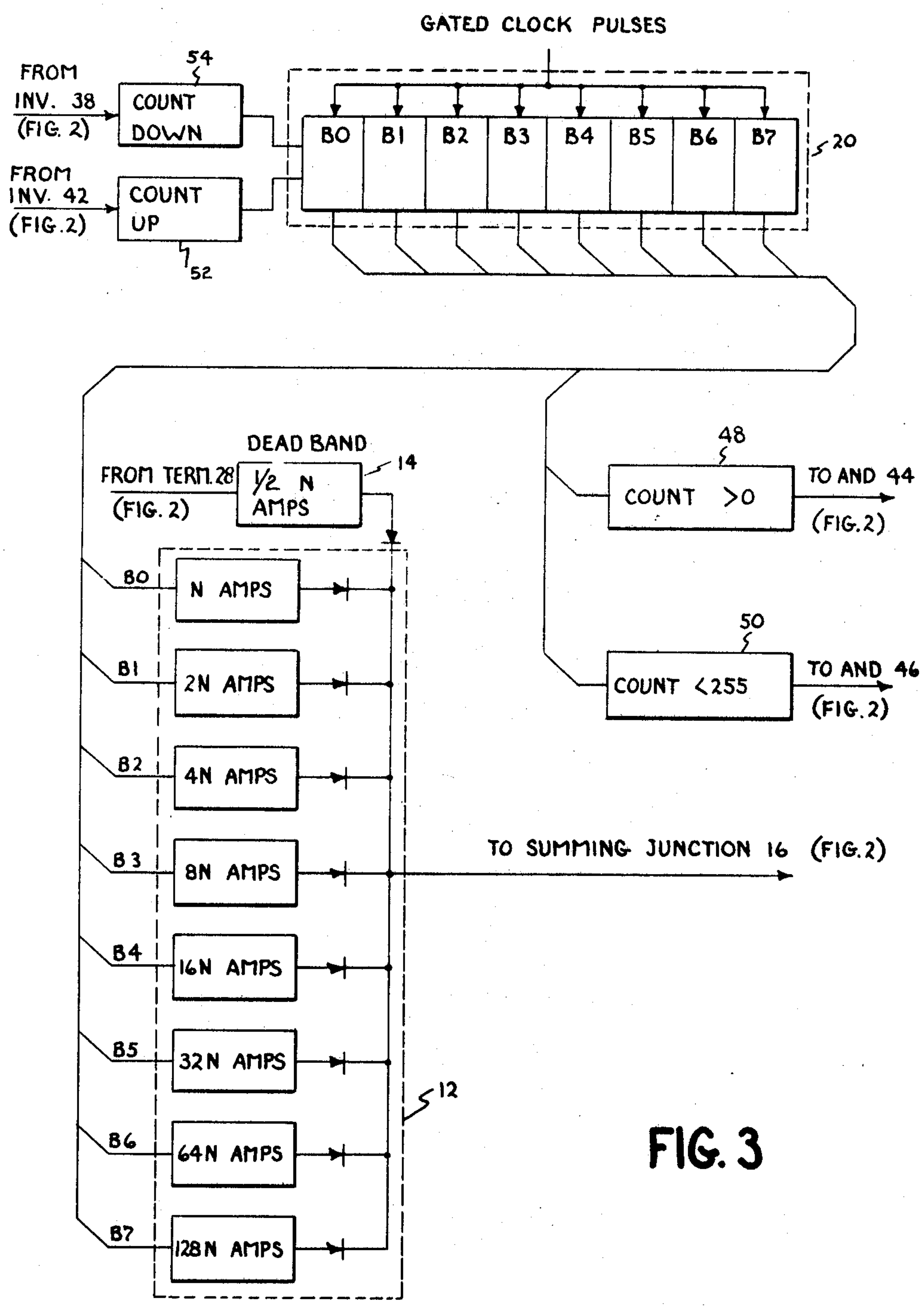
FIG. 3 is a simplified schematic diagram of a reversible binary counter and of positive current sources for the counter control circuit.

The signals appearing on the output of the inverter elements 38 and 42 are applied to AND gates 44 and 46, respectively. The clock pulses appearing on the output of the inverter 34 are applied to both of these AND gates. AND gate 44 also has an input on the inverse output terminal 30 of the shift register element 26 and from a counter limiting circuit 48 (shown in block diagram form in FIG. 3) which produces a ZERO signal only if the reversible binary counter 20 is gated to count down but already has a count of zero. AND gate 46 is connected to the normal output terminal 28 of the shift register element 26 and to a counter limiting circuit 50 (shown in FIG. 3) which produces a ZERO signal only if the counter is gated to count up and is already full. For purposes of illustration, an 8 bit reversible binary counter is shown which contains a decimal count of 255 when full. If the shift register elements 26 and 32 are both in their first or set condition and the counter is not full, the AND gate 46 transmits or gates clock pulses appearing on the output of the inverter 34 to cause the counter 20 to accumulate counts. If shift register elements 26 and 32 are both in their second or reset state and the count in the counter is greater than zero, the AND gate 44 gates clock pulses appearing on the outut of the inverter element 34 to cause the counter 20 to count down at a clock pulse rate.

The direction in which the counter 20 counts is determined by the logic level of the signals on the output terminals of the shift register element 32. When the shift register element 32 is in its set state, the ZERO signal appearing on the inverse output terminal 40 is inverted by the inverter element 42 to produce a ONE signal. This ONE signal is applied to a circuit 52 which causes the reversible binary counter 20, consisting of bits B0 through B7, to accumulate one count for each gated clock pulse. When the shift register element 32 is in its reset state, the ZERO signal appearing on its normal output terminal 36 is inverted by the inverter element 38 before being applied to a count-down circuit 54. When a ONE signal is applied to the circuit 54, each gated clock pulse applied to the counter 20 causes the count to decrease by one step.

Each of the bits B0–B7 contained in the counter 20 is a bistable device which operates either in a set state or in a reset state. In addition to providing a digital representation of an analog input, each of the bits B0 through B7 controls a current producing circuit in the positive current source 12. If the controlling bit for a particular current producing circuit is in its set condition, the circuit produces a fixed current which is added to currents from all other current producing circuits before being applied to summing junction 16 for the comparison amplifier 10. The magnitude of the current produced by each current producing circuit is proportional to the weight given its controlling bit in the counter 20. For example, bit B2 controls a current reducing circuit 54 capable of producing current having twice the magnitude of that which could be produced by circuit 58 which is controlled by the next lower order bit B1 in the counter 20. The combined outputs of all of the current producing circuits in the current source 12 balance that magnitude of negative analog current which would cause the counter 20 to accumulate its full count of 255.

Current developed by a deadband current source 14 is also added to the current produced by the current source 12. Unlike the circuits in the current source 12, the deadband current source 14 is not controlled by the counter 20. Instead, the deadband current source 14 is connected to the normal output terminal 28 of the shift register element 26. When the shift register element 26 is in its set state, the ONE signal appearing on its normal output terminal 28 causes the deadband current source 14 to apply a current at the summing junction 16 of the comparison amplifier 10. The magnitude of the current applied to the summing junction 16 by the deadband current source 14 is equivalent to approximately ½ count in the counter 20. In a preferred embodiment, this magnitude is adjustable to compensate for differences in the noise levels at the analog input. If the electrical noise at the analog input is relatively high, the deadband current source 14 is adjusted to deliver more current to the summing junction 16 than if the electrical noise level is low.

Figure 4:
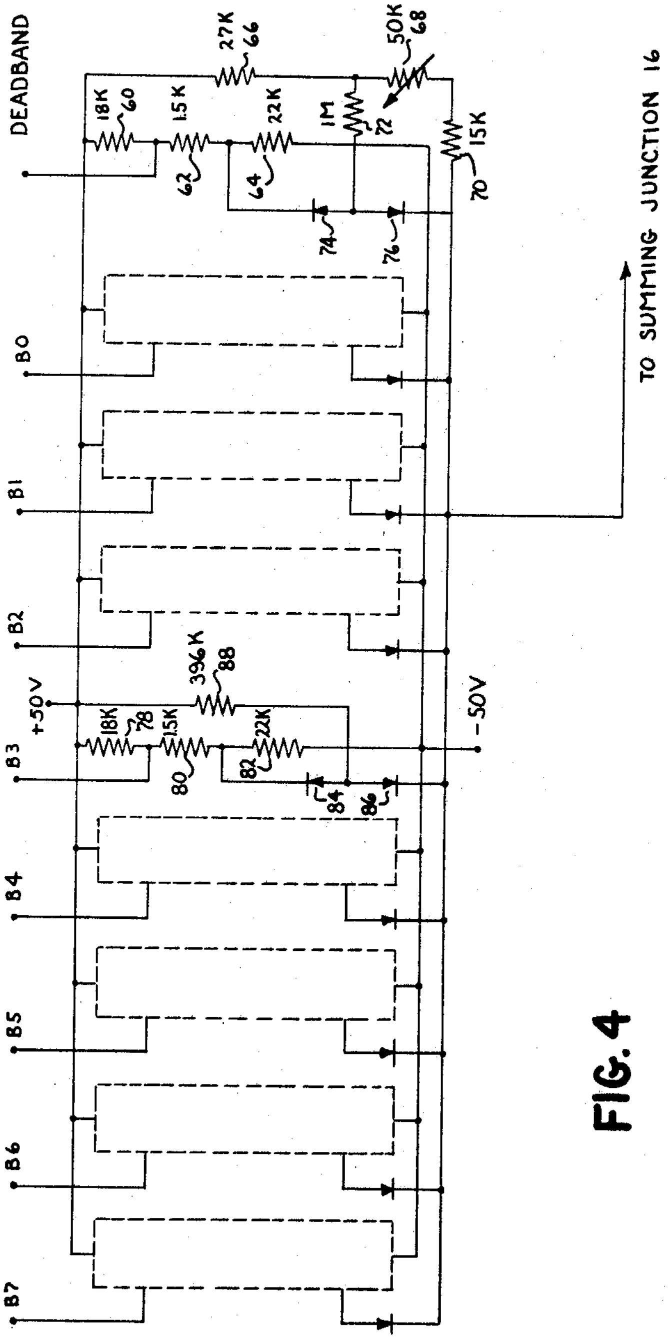
FIG. 4 is a schematic diagram showing the details of the positive current sources.

The current sources 12 and 14 are shown in greater detail in FIG. 4. The deadband current source 14 contains a voltage divider with resistors 60, 62, and 64 connected between positive and negative voltage sources which, for purposes of illustration, are assumed to carry voltages of +50 volts and −50 volts, respectively. The normal output terminal 28 of the shift register element 26 is connected to the junction of the resistors 60 and 62. A second voltage divider including resistors 66, 68, and 70 is connected between the positive voltage source and the summing junction 16. The voltage at the junction of the resistors 66 and 68 in this second voltage divider is applied through a current limiting resistor 72 to the common anodic junction of a pair of inversely poled diodes 74 and 76. The cathode of the diode 74 is connected to the junction of the resistors 62 and 64 in the first voltage divider whereas the cathode of the diode 76 is connected to the summing junction 16. When a ONE signal is applied to the junction of the resistors 60 and 62 from the normal output terminal 28 of the shift register element 26, the diode 74 is back biased and the current flowing through the resistor 72 is directed through diode 76 to the summing junction 16. However, if a ZERO signal is applied to the junction of resistor 60 and 62, the diode 74 is forward biased while the diode 76 is back biased so that the current flowing through resistor 72 is not applied at the summing junction 16.

Each of the first three current producing circuits in the current source 12 is similar to the deadband current source and varies only in the magnitude of current which it can deliver to the summing junction 16. The current producing circuits in the source 12 which produces the greater magnitudes of current are similar to the deadband current source that each includes a first voltage divider. A current producing circuit controlled by bit B3 of the counter 20 is shown in detail to illustrate their construction. The current producing circuit includes resistors 78, 80, and 82. The output of bit B3 is connected to the junction of resistors 78 and 80 whereas the cathode of a diode 84 is connected to the junction of the resistors 80 and 82. The anode of the diode 84 is connected to the anode of a diode 86 at a junction at the lower end of a resistor 88 leading to the positive voltage source. The resistor 88 limits the magnitude of current delivered from the positive voltage source to the junction of the diodes 84 and 86. If a ONE signal is applied by bit B3 to the junction of resistors 78 and 80, diode 84 is back biased and the current flowing through resistor 88 is delivered to the summing junction 16. Conversely, if a ZERO signal is applied to the junction of the resistors 78 and 80, the diode 86 is back biased and the current flowing through resistor 88 passes through diode 84 and resistor 82 to the negative voltage terminal rather than to summing junction 16.

Figure 5:
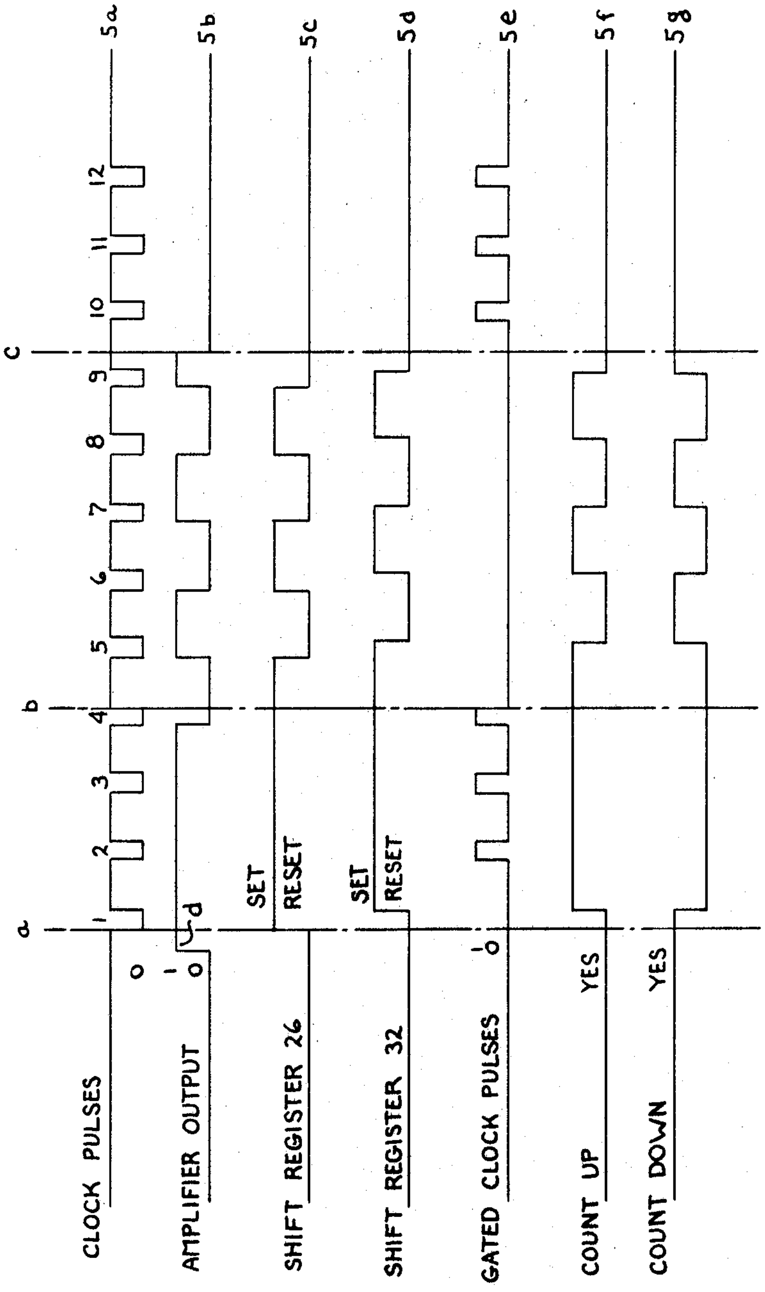
FIG. 5 is a waveform chart used in the explanation of the operation of the counter control circuit shown in FIGS. 2 and 3.

The operation of the circuit disclosed is explained with reference to the waveform chart shown in FIG. 5. Beginning at the left side of the waveform chart, it is assumed that the analog input to the comparison amplifier 10 suddenly becomes more negative than the input from the current sources 12 and 14. The output of the amplifier 10, shown as waveform *5b*, becomes a ONE signal which, after undergoing inversion in the NOR circuit 22 and reinversion in inverter element 24, finally causes a ONE signal to be applied to the steering terminal S1 for the shift register element 26. At time *a* the leading edge of clock pulse 1, shown in waveform *5a*, steers the shift register element 26 into its set state, shown as waveform *5c*, wherein a ONE signal appears on its normal output terminal 28 and a ZERO signal appears on its inverse output terminal 30. The ONE signal on the normal output terminal 28 is applied both to the steering terminal S1 of the shift register element 32 and to the deadband current source 14 to cause the source 14 to apply current to the summing junction 16 for the amplifier 10. The clock pulses which set the shift register element 26 are inverted by the inverter 34 and applied to a second input to the NOR circuit 22 to provide a ONE signal on the steering terminal S1 of the shift register element 26 during the pulse width. This ONE signal on the steering terminal S1 during the clock pulse clamps the shift register element 26 to the condition which it assumed at the leading edge of the clock pulse so that changes in the output of the comparison amplifier 10 during the clock pulse have no effect until the succeeding clock pulse.

Clock pulse 1 appears at the output of the inverter element 34 in inverted form and is applied to the pulse input terminal P of the shift register element 32, the state of which is shown in waveform *5d*. Since the steering terminal S1 of the shift register element 32 has a ONE signal thereon following the setting of the shift register element 26 at the leading edge of clock pulse 1, the shift register element 32 becomes set at the trailing edge of that clock pulse. The setting of the shift register element 32 causes ONE and ZERO signals to appear on output terminals 36 and 40, respectively. After the signals are inverted by tthe inverter elements 38 and 42, a ONE signal appears at the input (waveform *5f*) to the countup circuit 52 while a ZERO signal appears at the input (waveform 5g) to the countdown circuit 54. With the ONE signal being applied at the input of the circuit 52, the reversible binary counter 20 accumulates one count for each clock pulse gated to it. During the first clock pulse, the AND gate 44 is inhibited by the ZERO signal on the inverse output terminal 30 of the shift register element 26 which is set during this time. During the first clock pulse, the AND gate 46 is also inhibited but by the ZERO signal at the output of inverter 42 connected to the inverse output terminal 40 of the shift register element 32, which is in a reset state until the trailing edge of the first clock pulse.

After the shift register element 32 is set at the trailing edge of clock pulse 1, the AND gate 46 is enabled by the ONE signals appearing on the normal output terminal 28 of the shift register element 36 and on the output of the inverter element 42 connected to the inverse output terminal 40 of the shift register element 32. The shift register elements 26 and 32 remain in their set state as long as the comparison amplifier 10 has a ONE signal on its output. Since both shift register elements 26 and 32 are set, clock pulses 2, 3, and 4 (waveform *5e*) appearing at the output of the inverter 34 are transmitted through the AND gate 46 to the inputs of the reversible binary counter 20. As the counter 20 counts up, the amount of current produced by the current source 12 increases in proportion to the magnitude of the count existing in the counter 20.

At time *b*, at the trailing edge of clock pulse 4, the output of the current sources 12 and 14 is assumed to exceed the analog input. The output signal from the comparison amplifier 10 goes from ONE to ZERO under these conditions. The ZERO signal at the input of the NOR circuit 22 is inverted to produce a ONE signal on the steering terminal S0 for the shift register element 26. At the leading edge of clock pulse 5, shift register element 26 is steered to its reset state wherein the deadband current source 14 is de-activated and a ONE signal is applied to the steering terminal S0 for the shift register element 32. If the negative analog current applied to the comparison amplifier 10 remains relatively constant, the deactivation of the deadband current source 14 reduces the magnitude of positive current applied to the summing junction 16 so that the negative analog current again exceeds the output of the current source 12. The comparison amplifier 10 begins to produce a ONE signal when this change occurs at the leading edge of clock pulse 5. During clock pulse 5, shift register element 26 remains in its reset state while shift register element 32 remains in its set state. Neither AND gate 44 nor AND gate 46 is enabled so that no clock pulses are gated through the reversible binary counter 20. At the trailing edge of clock pulse 5, shift register element 32 is steered to its reset state by inverted clock pulse 5 appearing at the output of inverter element 34. At the leading edge of clock pulse 6, the ONE signal which appears on the output of the comparison amplifier 10 following the de-activation of the deadband current source 14 causes the shift register element 26 to be steered into its set state. Since the shift register element 32 is reset while the shift register element 26 is set, the clock pulse 6 is not gated to the reversible binary counter 20. When the shift register element 26 is set at the leading edge of clock pulse 6, the deadband current source 14 is activated and the positive currents applied to the summing junction 16 once again exceed the negative analog current, assuming the negative analog current remains relatively constant.

As long as the analog remains at a relatively constant value, the shift register elements 26 and 32 continue to change states at the leading and trailing edges respectively of the clock pulses but are not concurrently in the same state so that neither AND gate 44 nor AND gate 46 is energized. Since no clock pulses are gated to the reversible binary counter 20, the counter contents remain at a fixed value rather than fluctuating. At time *c* between the clock pulses 9 and 10, it is assumed that the magnitude of the negative analog current is suddenly decreased so that the output of the comparison amplifier 10 goes from ONE to ZERO. This ZERO signal at the input of the NOR circuit 22 causes the shift register element 26 to be steered to its reset state at the leading edge of clock pulse 10. Since shift register element 32 is already in its reset state at this time, the AND gate 44 is enabled and clock pulse 10 is gated to the reversible binary counter 20 to cause the magnitude of count contained therein to decrease by one. At the trailing edge of clock pulse 10, the shift register element 32 is steered into its reset state due to the ONE signal appearing on its steering terminal S0. With both shift register elements 26 and 32 in their reset state, the clock pulses appearing at the output of the inverter 34 are gated through AND gate 44. Under these conditions, the ONE signal at the output of inverter element 38 is applied to countdown circuit 54 to cause the count contained in the reversible binary counter 20 to continue to decrease. The count in the reversible binary counter 20 and the current produced by the current source 12 continue to decrease until the positive currents applied to the summing junction 16 are once again exceeded by the negative analog current. When this occurs, the shift register elements 26 and 32 begin to change to opposite states so that no further clock pulses are gated to the reversible binary counter 20 until the analog input changes.

Although there has been described what is thought to be a preferred embodiment of the present invention, variations and modifications therein will occur to those skilled in the art. Therefore, it is intended that the appended claims shall cover all such variations and modifications as fall within the true spirit and scope of the invention.

What is claimed is:

1. For use with a reversible binary counter and a source of clock pulses, a counter control having a pulse gating circuit including:

(a) a first bistable device having a steering input terminal, a pulse input terminal connected to the source of clock pulses, and an output terminal, said first bistable device being steered at the leading edge of a clock pulse to its first state for a first logic level of a binary steering signal and to its second state for the second logic level of the binary steering signal;

(b) a pulse inverter connected to the source of clock pulses;

(c) a second bistable device having a steering input terminal connected to the output terminal of said first bistable device, a pulse input terminal connected to said pulse inverter, and an output terminal connected to the reversible binary counter, said bistable device being steered at the trailing edge of a clock pulse to the then existing state of said first bistable device; and (d) gating means responsive to concurrent similar states of said first bistable device and said second bistable device to gate clock pulses to the reversible binary counter to cause said counter to count in a direction determined by the logic level of the signal on the output terminal of said second bistable device.

2. A pulse gating circuit as recited in claim 1 wherein said gating means includes:

(a) a first AND gate having inputs from said first bistable device, said second bistable device, and said pulse inverter, said first AND gate being adapted to transmit pulses from said pulse inverter when input signals from said first bistable device and from said second bistable device indicate said devices are operating concurrently in their first state; and (b) a second AND gate having inputs from said first bistable device, said second bistable device, and said pulse inverter, said second AND gate being adapted to transmit pulses from said pulse inverter when input signals from said first bistable device and said second bistable device indicate said devices are operating in their second state.

3. A pulse gating circuit as recited in claim 1 in an analog to digital converter including:

(a) the reversible binary counter;

(b) a current source for producing currents having a first polarity and a magnitude proportional to the count existing in said reversible binary counter; and (c) a comparison amplifier having an output upon which the binary steering signal for said first bistable device appears and a summing input connected both to said current source and to an analog input carrying a current having a second polarity, said comparison amplifier producing a first binary steering signal when the analog current has the greater magnitude and a second binary steering signal when the source current has the greater magnitude.

4. A pulse gating circuit as recited in claim 2 in an analog to digital converter circuit including:

(a) the reversible binary counter;

(b) a current source for producing currents having a first polarity and a magnitude proportional to the count existing in said reversible binary counter; and (c) a comparison amplifier having an output upon which the binary steering signal for said first bistable device appears and a summing input connected both to said current source and to an analog input carrying a current having a second polarity, said comparison amplifier producing a first binary steering signal when the analog current has the greater magnitude and a second binary steering signal when the source current has the greater magnitude.

5. A pulse gating circuit as recited in claim 3 further including a deadband current source for maintaining said first bistable device and said second bistable device in opposite states when the magnitude of the source currrent is approximately equal to the magnitude of the analog current, whereby the gating means is prevented from transmitting pulses to said reversible binary counters.

6. A pulse gating circuit as recited in claim 5 wherein said deadband current source is connected to the output terminal of said first bistable device and is adapted to supply current to the summing junction of said comparison amplifier only while said first bistable device is in its first state.

References Cited

UNITED STATES PATENTS

| | | |
|---|---|---|
| 3,145,292 | 8/1964 | Schwaninger. |
| 3,151,252 | 9/1964 | Leightner. |
| 3,189,891 | 6/1965 | Karsh. |
| 3,268,713 | 8/1966 | Kunikowski. |
| 3,272,971 | 9/1966 | Kunikowski. |

MAYNARD R. WILBUR, Primary Examiner

JEREMIAH GLASSMAN, Assistant Examiner

U.S. Cl. X.R.

235—92